Figure 4:
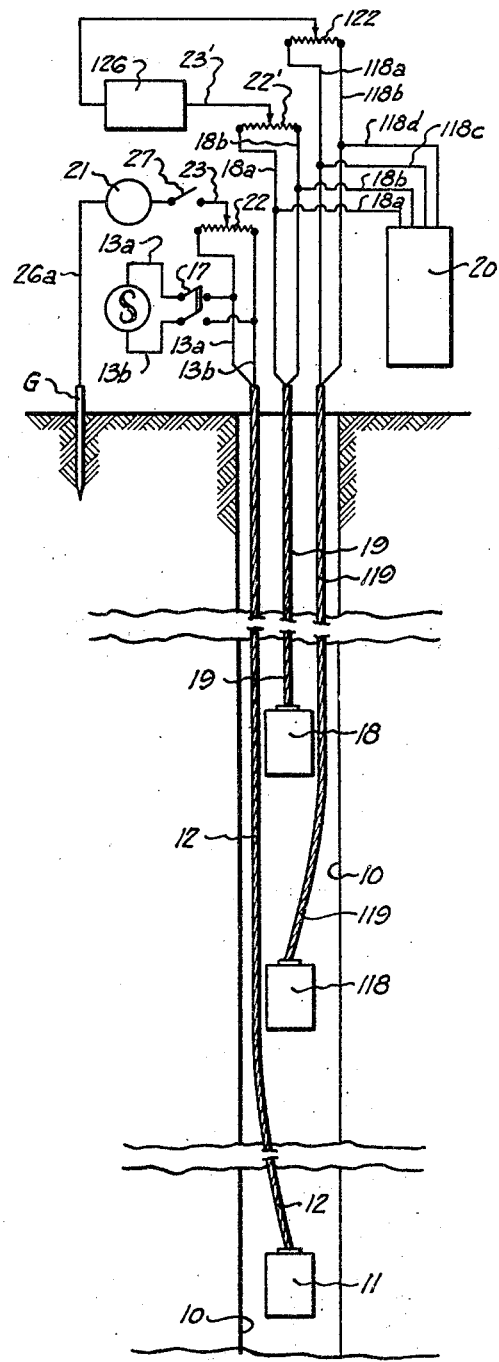

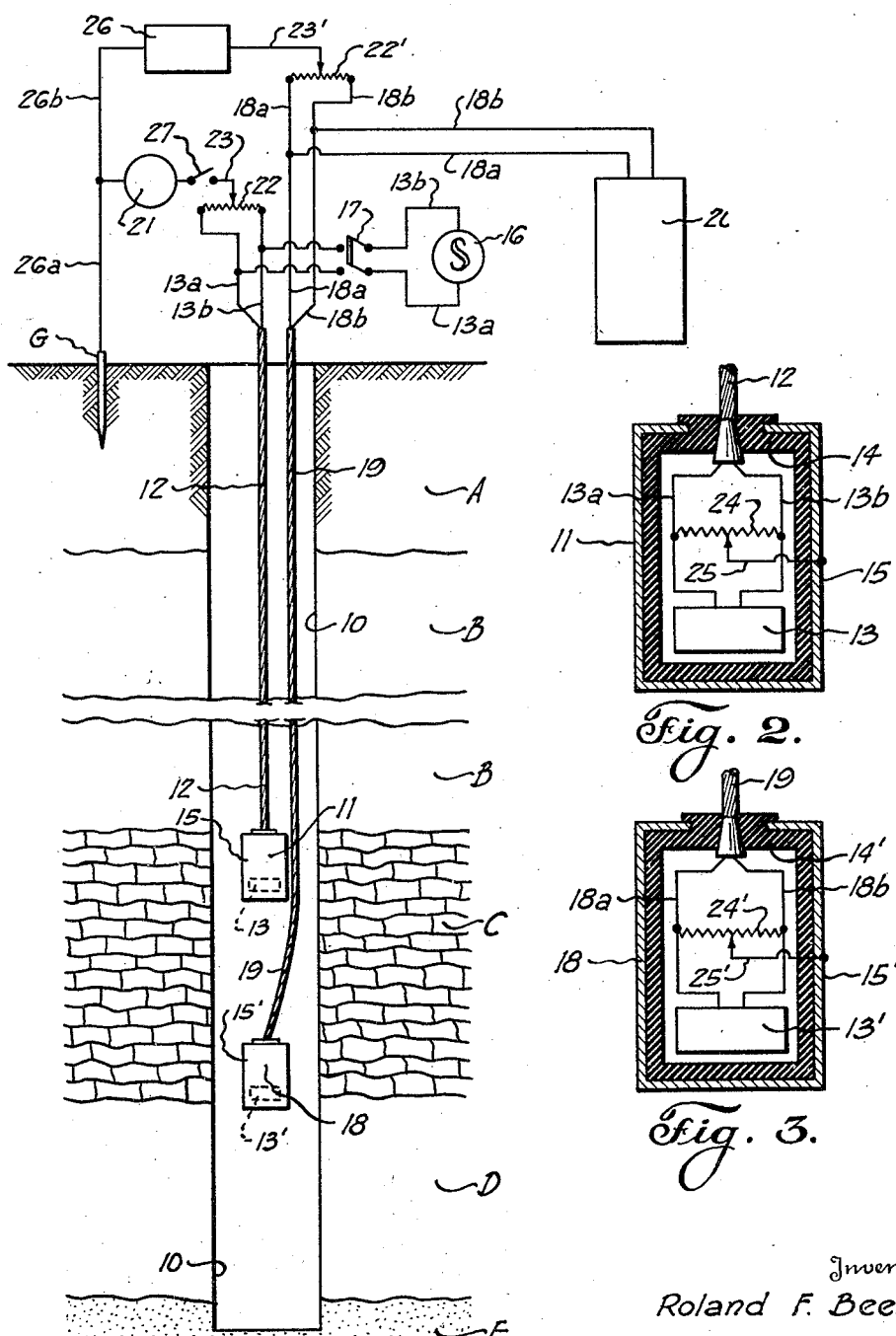

Dec. 1, 1942.    R. F. BEERS    2,304,051
MEANS FOR ANALYZING AND DETERMINING THE
CHARACTERISTICS OF THE GEOLOGIC STRATA
Filed Feb. 5, 1940    2 Sheets-Sheet 2

Inventor
Roland F. Beers
By Jack A. Ashley
Attorney

Patented Dec. 1, 1942

2,304,051

UNITED STATES PATENT OFFICE 2,304,051

MEANS FOR ANALYZING AND DETERMINING THE CHARACTERISTICS OF THE GEOLOGIC STRATA

Roland F. Beers, Dallas, Tex.

Application February 5, 1940, Serial No. 317,234

4 Claims. (Cl. 175—182)

This invention relates to new and useful improvements in methods of and means for analyzing and determining the characteristics of the geologic strata below the surface of the earth.

In the search for petroleum and mineral deposits, various methods have been employed for determining the characteristics of geologic strata below the earth's surface since such characteristics are indicative of the presence or absence of said deposits. Electrical methods of geophysical exploration, such as disclosed in Patent No. 1,913,293, issued to Schlumberger, and Patent No. 2,037,306, issued to Blau et al., have been used and have given satisfactory results, within certain limits. Also, various seismic methods, wherein the transmission of sound waves through the subsurface strata is utilized for analyzing the formation have been found successful, such a seismic method being disclosed in my co-pending application, filed May 5, 1938, Serial No. 206,662. Although, each of the methods, electrical and seismic, now commonly practiced are successful to a degree, each has its limitations, whereby under certain conditions, accurate measurements and data are not obtainable. For example, the usual electrical method is frequently unable to discriminate between a sand saturated with oil or gas and a sand which is silted with lime or marl. This particular discrimination would be quite simple wth a seismic method because the difference in velocity of propagation of sound waves through two such formations would be readily discernible. Similarly, the seismic methods of geophysical exploration have certain limitations not found in electrical methods. Thus, it will be seen that each method, either electrical or seismic, is satisfactory within certain limits, but each has certain dsadvantages not present in the other.

It is, therefore, one object of this invention to provide an improved method for analyzing and determining the characteristics of subsurface strata, which combines the features of electrical methods with those of seismic methods, whereby an accurate survey may be obtained.

An important object of the invention is to provide an improved method for determining physical characteristics of subsurface formations wherein an electrical survey and a seismic survey of said formations may be made so as to accurately analyze said formations; the arrangement being such that the electrical survey made be made either simultaneously with, or independently of, the seismic survey.

Still another object of the invention is to provide an improved method of geophysical exploration, wherein seismic waves are transmitted into the formation, and the velocity of propagation and other physical properties of said waves through the formation accurately determined, and also wherein electrical power is transmitted through the formation and electrical measurements taken, said electrical measurements together with the velocity of propagation of said sound waves yielding valuable information as to the characteristics and nature of the formation.

A particular object of the invention is to provide an improved apparatus for analyzing subsurface structures which includes a transmitter and receiver, or receivers, adapted to be lowered through the bore hole, in spaced relation, with means for transmitting either electrical or seismic waves from said transmitter, whereby either an electrical or seismic survey may be made; the construction of the transmitter being such that both electrical and seismic power may be transmitted simultaneously so that both surveys may be accomplished at the same time and during one lowering of the instrument through the bore hole.

A still further object of the invention is to provide an improved apparatus, of the character described, wherein a "phantom circuit," or some other suitable method, is employed to conduct the current to the transmitting electrode, whereby a single pair of conductors may be used for the current, necessary for both electrical and sound wave transmission.

For the purposes of this description the terms "sound waves" and "seismic waves" are to be considered identical.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a diagrammatical view of an apparatus, constructed in accordance with the invention, for carrying out the improved method, Figure 2 is a transverse, vertical, sectional view of the transmitter, Figure 3 is a view, similar to Figure 2, of the receiver, and Figure 4 is a view, similar to Figure 1 and illustrating a modified form of apparatus for carrying out the improved method.

In the drawings, the numeral 10 designates a bore hole drilled through the subsurface formations or strata of the earth. As shown, the bore extends successively through the weathered layer A, consisting of soil and other unconsolidated materials, the layer B of shale, layer C of limestone, another layer D of shale, and finally a layer E of sandstone. These layers have been shown symbolically and have been arbitrarily chosen, merely for the purpose of illustration; manifestly, the particular locality in which the bore 10 is drilled determines the geologic section encountered.

In carrying out the invention, for the purpose of investigating the various layers, a transmitter 11 is arranged to be lowered into the bore hole on a cable 12. This transmitter includes a seismic oscillator or acoustic generator which may take the form of an electromagnetic oscillator as, for instance, the Fessenden oscillator, of the usual type now in general use, or any other similar electromagnetic device, whereby when an alternating current of predetermined frequency is impressed upon said oscillator, a sound will be generated. The transmitter is also arranged to send out electrical waves, as will hereinafter appear. The seismic oscillator is illustrated at 13 in Figure 2 and is mounted within a housing or case 14 which is preferably constructed of electrical insulating material. The lower end of the cable is suitably secured within the top of the housing, whereby the transmitter is suspended from said cable. A metallic casing or shell 15 surrounds the housing 14 and this shell acts as an electrode which is utilized when making an electrical survey, as will be explained.

When the transmitter 11 is lowered into the bore 10, it will be manifest that the seismic oscillator 13 is located adjacent to, or in the immediate vicinity of the formation and the sound generated by said oscillator is transmitted into the formation. The oscillator is connected to lead wires 13a and 13b which extend upwardly through the supporting cable 12 to the surface, where said wires have connection with a suitable A. C. generator 16. When the generator is operated, electrical energy is delivered to the oscillator 13, which converts said electrical energy into sound energy and the generated seismic or sound waves radiate or travel outwardly to penetrate the formation. A suitable switch 17, either manual or automatic, may be connected in the wires 13a and 13b to control operation of the oscillator 13. Although it is preferable that A. C. current be supplied to the generator, the invention is not to be limited to the use of such current, as D. C. current could be employed; also, the particular type of sound generator is subject to variation, as for example, an impulse generator would serve the purpose.

It is well known that the velocity of sound travel through a formation varies according to the type or character of material encountered. Thus, the velocity of seismic waves travelling through limestone is different from the velocity of said waves travelling through shale, or other formations. Therefore, by ascertaining the velocity of sound travel through a formation and by a knowledge of the ranges of velocities found for various formations, such as shale, sandstone, etc., the kind or character of material encountered may be readily determined.

Any suitable means may be employed for determining the velocity of propagation of the sound waves generated and transmitted into the formation by the oscillator, as for example, the method disclosed in my co-pending application, filed May 7, 1938, Serial No. 206,662, would be satisfactory. However, a receiver 18, which is arranged to be lowered into the bore hole has been illustrated. This receiver is constructed in substantially the same manner as the transmitter 11 and includes an electromagnetic device 13' which is disposed within a housing 14', said casing being preferably insulated and being encased within a metallic shell 15', the latter acting as an electrode, as will be explained. The receiver 18 is attached to the lower end of a cable 19 and suitable conductors or wires 18a and 18b lead from the device 13' and extend upwardly through the cable. Both the cable 19 which supports the receiver 18 and the cable 12 which carries the transmitter 11 may be wound on a suitable drum or drums (not shown) to facilitate lowering and raising the same through the bore.

The conductors or wires 18a and 18b which lead from the receiver extend to the surface and are electrically connected with a suitable indicating instrument. This instrument may be a cathode-ray oscillograph, or other suitable device capable of indicating the velocity of propagation of the sound waves travelling through the formation from the transmitter to the receiver.

In making the seismic survey, the transmitter 11 and receiver 18 are lowered into the bore 10 to the desired position and are properly spaced from each other, the spacing being determined by the geologic conditions. The oscillator 13 is then excited so that sound is generated and transmitted into the formation and propagated at a velocity dependent upon the structure of the formation. If a fluid column is present in the bore, such column will not interfere with the transmission of the sound waves through the formation for it is well known that the velocity of sound travel through a formation in situ is relatively greater than the velocity of sound travel through a fluid. Therefore, the sound will travel from the transmitter 11 to the receiver 18 through the formation at a greater velocity than the sound travelling through the column of fluid, with the result that the sound which passes through the formation will arrive at the receiving unit first. The sound wave arriving at the receiver, produces an electric voltage in the device 13' and this voltage is transmitted, by the wires 18a and 18b, to the measuring and indicating equipment 20 at the surface. By means of the equipment 20 which, as has been explained, may be of any suitable construction, the time required for sound to travel from the transmitter 11 to the receiver 18 by way of the geologic formation may be measured. The time required for such travel is indicative of the velocity of propagation of the seismic waves through the formation and since this velocity varies according to the type of formation, the characteristics and structure of said formation may be readily determined.

From the above, it will be seen that seismic survey of the bore 10 may be readily accomplished to gain valuable information as to the characteristics of the subsurface structure. However, as is well known to those versed in the art, a seismic survey has its limitations and under certain geologic conditions might not provide all the necessary information regarding the formations. Thus, it is desirable in many instances to supplement the seismic survey with an electrical survey or simultaneously to make an electrical survey in order to obtain additional data on the subsurface formations.

There are, at present, various electrical methods now commonly practiced and any of such methods may be combined with the seismic method to accomplish the result. An electrical method, similar to that disclosed in Patent No. 1,913,293, issued to Schlumberger, has been illustrated herein but the invention is not to be limited to this particular method.

As shown, a suitable D. C. generator 21 is employed as the source of current supply and this generator is connected to the lead wires 13a and 13b through a "phantom circuit" hook-up. A resistance 22 is connected across the wires 13a and 13b and a conductor 23 electrically connects the resistance to the generator 21. When the generator is operated, the current flows through the wires 13a and 13b downwardly to the transmitter. A second resistance 24 is connected across the wires 13a and 13b within the transmitter housing 14 in advance of the oscillator 13 and the current from the generator 21 flows through the resistance. A lead 25 connects the resistance to the metallic shell or electrode 15 of the transmitter. The electrical circuit is completed through the adjacent formation and upwardly through the earth to a ground rod G which has electrical connection with the generator 21 through the wire 26a. The use of the "phantom circuit" makes possible the simultaneous transmission of current from both generators 16 and 21 over the same conductors 13a and 13b without interference, whereby both electrical and sound waves may be generated and transmitted into the formation simultaneously.

The receiver 18, being constructed in the same manner as the transmitter 11, has a resistance 24' extending across the conductors 18a and 18b, such resistance being located within the housing in advance of the oscillator 13'. A lead 25' connects this resistance with the electrode or shell 15' of the receiver. The electrical waves transmitted by the electrode 15 traverse the formation and are received by the electrode 15' and then are conducted upwardly through the conductors 18a and 18b. A second resistance 22' is connected across the wires 18a and 18b at the surface and a lead 23' extends from this resistance to one side of a potentiometer 26, or other electrical measuring instrument. The other side of the potentiometer is connected by a wire 26b with the wire 26a leading to the generator 21. A suitable switch 27, either manual or automatic, may be connected in the wire 23 to control operation of the generator 21.

From the foregoing, it will be seen that electrical current is caused to traverse the formation and the electrical potentials are measured by the potentiometer. In this manner, an electrical survey yielding valuable information as to the characteristics of the subsurface formation may be made. Through the use of the "phantom circuit" hook-up, it is possible to make the electrical survey at the same time, and simultaneously with, the seismic survey, and over the same wires without interference. By manipulating the switches 17 and 27, either one of the generators 16 and 21 may be actuated to accomplish either an electrical or seismic survey, as desired. Thus, the advantages of both electrical and seismic surveys are combined, whereby all possible information regarding the subsurface formation may be obtained during a single "run" of the instruments through the bore. As before stated, the particular seismic method or the particular electrical method employed is subject to variation for so long as it is possible to perform both an electrical and seismic survey of the bore, the invention will be carried out.

In Figure 4, a slightly modified form of the invention is shown. In this form, a second receiver 118 is provided and this receiver is constructed in exactly the same manner as the receiver 18. A cable 119 has its lower end attached to the receiver 118 and extends to the surface, being wound on a suitable drum (not shown). Lead wires 118a and 118b are connected to the oscillator 113' of the receiver and are housed within the cable, the upper ends of said wires being connected to the wires 118c and 118d at the surface. These latter wires have connection with the oscillograph, or other recording instrument 20. A resistance 22' is disposed across the wires 18a and 18b and a conductor 23' leads from the balancing point of this resistance to the potentiometer 126. The potentiometer also has connection with the balancing point of a similar resistance 122, which is similarly connected across the second receiver 118. Obviously, with the above arrangement, the receiver 118 functions in the same manner as the receiver 18.

In practicing the method with the apparatus shown in Figure 4, the transmitter 11 is lowered into the bore hole into a position below the two receivers 18 and 118, the distance between the lower receiver 118 and said transmitter preferably being greater than the distance between the receivers. When the current is conducted to the case electrode of the transmitter, as explained, an electrical field is established between the case of the transmitter and the ground connection G at the surface. The distribution of this electrical field will depend upon the electrical characteristics of the intervening formations, such as the resistivity, porosity, degree of saturation with conducting electrolytes, etc. By suitably spacing the two receivers 18 and 118, with respect to each other and with respect to the transmitter 11, the distribution of electrical potential in the geologic formation can be investigated. Thus, information as to the character of the subsurface strata may be obtained. It is preferable in practicing the method to lower the instruments to the bottom of the well bore 10 and dispose the same in their proper relative positions, after which the instruments are gradually raised through the bore; as the instruments move upwardly, observations may be made of the electrical potential difference existing between the two receivers 18 and 118. Of course, the instruments may be lowered to any desired elevation and held stationary at such elevation while a reading is taken of the surrounding formation.

At the same time that the electrical survey is being made, the oscillator 13 may be excited so as to transmit sound or seismic waves of the desired character. Such waves are propagated in all directions through the geologic formations and some of the sound waves pass through the formations and are received, in turn, by each of the two receivers 18 and 118. The quantity of sound received by each of the two receivers will, of course, be different because of their spacing and also because of the formation, or formations, located therebetween. The relative difference between the quantity of sound received by each of said receivers is apparent on the recording device 20 at the surface and manifestly, since such relative difference is in part due to the character of the subsurface formation, the sound propagation characteristics of the intervening geologic formations may be determined. A sound wave emitted from the oscillator 13 will arrive at the lower receiver 118 first and prior to its arrival at the second receiver 18. The time interval between the instant of arrival of any sound wave at each of the two receivers provides an indication of the velocity of sound propagation through the intervening formations and thereby yields valuable information as to the character of such formations. From the foregoing it will be seen that many electrical and seismic properties of the geologic formations may be obtained for use in determining the physical structure of such formation. The electrical and seismic surveys may be made either individually at different times or simultaneously, as desired.

The use of the "phantom circuit" hook-up disclosed in Figures 1 to 4 makes it possible to transmit both electrical and seismic waves into the formation simultaneously, the current for both being conducted over the same wires.

The foregoing description of the invention is explanatory thereof and various changes in the size, shape, and materials, as well as in the details of the illustrated construction may be made, within the scope of the appended claims, without departing from the spirit of the invention.

What I claim and desire to secure by Letters Patent is:

1. A system for determining the characteristics of geologic strata traversed by a bore hole, comprising means having an external metallic conductor for generating sound waves at one point in the bore hole, means also having an external metallic conductor for receiving said sound waves at another point in said bore hole, means providing an electrode externally of said bore hole and circuit means including electrical conductors for said sound transmission and receiving means having bridge elements connected across said conductors at both ends thereof with center tap connections from said bridge elements to said external metallic conductors, a phantom circuit between said electrode and said conductors for impressing electrical potentials between the external metallic conductors in said bore hole and said external electrode, and means connected in said phantom circuit for measuring currents and the potentials traversed over said circuits.

2. A system for determining the characteristics of geologic strata traversed by a bore hole, comprising sound transmitting means and sound receiving means positioned in said bore hole, electrical means comprising pairs of electrical conductors connected to said sound transmitting and to said sound receiving means, an electrode positioned externally of said bore hole and means forming a balanced circuit between said electrode and said conductors, said means including a second electrode associated with said sound transmitting and said sound receiving means positioned in said bore hole and electrical bridging elements connected across said conductors at both ends thereof with center taps connected respectively to each of said electrodes, means for impressing a potential over said balanced circuit and means for independently measuring electrical values between said transmitter and receiver, and said electrode on the one part, and acoustic transmission values between the said transmitter and receiver on the other part.

3. A system for determining the characteristics of geologic strata traversed by a bore hole which comprises electro acoustic means for transmitting sound waves through said bore hole, a plurality of electro acoustic receiving means for receiving waves transmitted by said transmitting means, electrical generating and electrical indicating means and independent conducting lines connecting sail generating and indicating means to said sending and receiving means respectively, said sending and receiving means having externally exposed electrodes connected respectively to electrically balanced points between said conducting lines and forming with said conducting lines independent balanced circuits, and means for impressing electric currents over said balanced circuits and measuring the constants thereof.

4. A system for determining the characteristics of geologic strata traversed by a bore hole which comprises electroacoustic means for transmitting sound waves through said bore hole, a plurality of electroacoustic receiving means for receiving waves transmitted by said transmitting means, electrical generating and electrical indicating means and independent conducting lines connecting said generating and indicating means to said sending and receiving means respectively, said sending and receiving means having externally exposed electrodes connected respectively to electrically balanced points between said conducting lines and forming with said conducting lines independent balanced circuits, a further external electrode, a measuring device and a direct current source, each having one electrical terminal connected to said last named electrode and the other terminals connected, respectively, to electrically balanced points between said conducting lines.

ROLAND F. BEERS.